Patented Jan. 11, 1938

2,105,363

UNITED STATES PATENT OFFICE 2,105,363

SYNTHETIC COMPOUND AND METHOD FOR ITS PRODUCTION

Paul Nowak and Hermann Hofmeier, Berlin-Charlottenburg, Germany, assignors to General Electric Company, a corporation of New York No Drawing. Application October 9, 1935, Serial No. 44,251. In Germany October 31, 1934

4 Claims. (Cl. 106—22)

The present invention relates to a synthetic compound or artificial mass adapted for use in the construction of insulated electrical conductors and cables and to a method of making the same.

It has been suggested to use for the covering of electric cables or for the insulation of electric conductors, compounds which consist entirely or partly of polymers of acrylic acid or its homologues or similar materials. These compounds do not always satisfy the strict requirements which must be placed upon them in many cases. Insufficient resistance to cold of such compounds is particularly noticeable in conductors and cables which are installed in a suspended position in air. In the case of such cables, it is necessary to figure, under the climatic conditions which apply for instance in Germany, that they are subjected to oscillations due to wind at temperatures from $-30$ to $-40°$ C. and for that reason it is necessary that the cable sheaths be sufficiently elastic, even at these temperatures, in order to absorb these oscillations without damage. On the other hand, the temperature may rise to approximately $+60°$ C. The previously suggested mixtures, as a general rule, can withstand, without difficulty, a temperature of $+60°$ and above. However, at low temperatures, its breaking strength is reduced so markedly—even though the tensile strength increases simultaneously—that a cable sheath of this material is subjected to an increased danger of breaking.

In order to avoid these disadvantages, it would seem obvious either to utilize for the manufacture of the compounds used in cable engineering those polymers which have a very low degree of polymerization and which consequently are still soft at ordinary temperatures, or to obtain mixtures, which have sufficient elasticity in the case of a severe cold spell, by means of additions of suitable softening mediums to the compounds. Tests have shown that this method actually leads to results. However, the mixtures so produced have the disadvantage that in the case of temperature rises, they become soft very rapidly and begin to flow.

It has been found, in an unexpected and surprising manner, that compounds can be obtained in which the required mechanical properties are retained within a large temperature range and particularly in that temperature range which must be considered for cables, if polymers of acrylic acid or its derivatives, or the homologues of acrylic acid or its derivatives, are used, which are polymerized to such an extent that they are no longer soluble in the usual solution mediums such as acetone, benzol, but in which they merely swell up. Such polymers are mixed with suitable softening mediums or swelling mediums which have a high boiling point, such, for example, as diamyl phthalate. Of course, any other known softener can also be used as long as it is taken up by the polymer.

In order to produce water-tight protective covers for cables of any desired type, which are particularly suitable to replace the customary lead sheaths, it is recommended that the mixture be made, according to the invention, as follows:

25–33 per cent acrylic acid ethyl ester (polymerized up to insolubility in acetone)
3–8 per cent diamyl phthalate
15–25 per cent active gas soot
40–60 per cent talcum or similar fillers
0.5–1.5 per cent $\beta$ naphthol
0.3–1.5 per cent sulphur The percentages are percentages by weight.

It is particularly recommended that the following composition be used:

27 per cent acrylic acid ethyl ester (polymerized up to insolubility in acetone)
5 per cent diamyl phthalate
19 per cent active gas soot
47.5 per cent talcum
1 per cent $\beta$ naphthol
0.5 per cent sulphur Preparation of the mixture can, to advantage, be carried out in such a way that the polymer is first mixed with the diamyl phthalate at a temperature of 60 to 80° C. by suitable means, for instance, milling, after which the mixture of the solid additional materials is slowly added. In that manner, a compound is obtained of a character resembling soft rubber which is still flexible at a temperature of $-25°$ C. when in thin strip form, for example when in the shape of strips 1 mm. thick and 10 mm. wide. Such a compound is free from the objectionable softening or flowing characteristics possessed by highly plasticized polymers of acrylic acid or its homologues or derivatives, and by those polymers of such compounds which have been polymerized only to a very limited degree and which therefore are still soft at ordinary temperatures. Compounds produced in accordance with this invention, in other words, not only have the described flexibility at reduced temperatures but also, as previously indicated, are non-flowing at the higher temperatures encountered in service use, which latter temperature, as hereinbefore mentioned, may be as much as plus 60° C.

If the requirements with regard to cold resistance are not too high, then it is also possible to utilize a part of the polymer in the form of a product insoluble in acetone, with another part which has a lower degree of polymerization, whereby the quantity of the required softening mediums is reduced. In this manner, compounds are obtained with an increased resistance to dissolving mediums.

It has already been suggested to mix together polymers of acrylic acid of different degrees of polymerization, for insulating purposes; however, it has not previously been recognized that synthetic materials can be produced which are plastic or elastic over a surprisingly large temperature range by using a product with the indicated degree of polymerization which is particularly high.

In order to vulcanize the compounds produced according to the method of the invention to produce a sulphurized polymer, it is possible to carry out the sulphurization in the presence of a surface-active material such as gas soot. These surface-active materials, which have a favorable influence on the sulphurization, can be mixed with the polymer together with the other additional materials, by carrying out the mixing between mixing rollers at an increased temperature. After the mixing on the roller, it is then possible to carry out the hot pressure treatment known from the vulcanization of caoutchouc.

If the compound produced according to the invention, is to serve for the insulation of electrical conductors, it is recommended that the polymerization product of acrylic acid derivative be mixed with polystyrol, while a certain percentage of solid filling mediums may, in certain cases, be added to the mixture. Instead of the polystyrol, it is also possible to use cellulose esters, preferably cellulose triester and particularly cellulose tripropionate, in certain conditions with the addition of filling mediums.

The compounds produced according to the invention, are not only distinguished by the fact that they are sufficiently elastic or plastic within a large temperature range to satisfy all the requirements which may be placed on a material for cables of all types, but in addition, they are outstanding because of good corrosion resistance. Furthermore, they are oil-proof and ozone-proof and resist aging. The compound is consequently suitable to an exceptional degree for use in cable engineering wherever rubber was used previously. The compound is further suitable for use in cable sheaths instead of lead and has the advantage over this material in that it has a much lower specific gravity and also a higher elasticity or plasticity—depending on the materials used for the production of the mixture. The compound made according to the invention can finally be used as a corrosion-resisting coating for cables of all types and for other construction parts in cable installations which are subjected to the weather. A coating of the compound can, in those cases, be used instead of the customary layers of fibrous material impregnated with bitumen.

What we claim as new and desire to secure by Letters Patent of the United States, is:

1. A composition of matter for use in the construction of insulated electrical conductors and cables which comprises the following mixed components within the approximate range of proportions shown:

| | Parts by weight |
|---|---|
| Acetone-insoluble polymer of acrylic acid ethyl ester | 25.0–33.0 |
| Diamyl phthalate | 3.0– 8.0 |
| Active gas soot | 15.0–25.0 |
| Inert, inorganic filling material | 40.0–60.0 |
| Beta-naphthol | 0.5– 1.5 |
| Sulphur | 0.5– 1.5 | said composition of matter, in the vulcanized state, having the characteristic properties of being resistant to oil, water, ozone, corrosion and aging, being non-flowing at temperatures up to at least 60° C., and still flexible when in thin strip form at a temperature of minus 25° C.

2. A composition of matter for use in the construction of insulated electrical conductors and cables which comprises the following mixed components in approximately the parts by weight specified:

| | Parts by weight |
|---|---|
| Acetone-insoluble polymer of acrylic acid ethyl ester | 27.0 |
| Diamyl phthalate | 5.0 |
| Active gas soot | 19.0 |
| Talc | 47.5 |
| Beta-naphthol | 1.0 |
| Sulphur | 0.5 |

3. A method of producing a synthetic compound which is resistant to oil, water, ozone, corrosion and aging, is non-flowing at temperatures up to at least 60° C., and is still flexible when in thin strip form at a temperature of minus 25° C., which method comprises preparing a mixture comprising the following substances within the approximate range of proportions shown:

| | Parts by weight |
|---|---|
| Acetone-insoluble polymer of acrylic acid ethyl ester | 25.0–33.0 |
| Diamyl phthalate | 3.0– 8.0 |
| Active gas soot | 15.0–25.0 |
| Inert, inorganic filling material | 40.0–60.0 |
| Beta-naphthol | 0.5– 1.5 |
| Sulphur | 0.5– 1.5 | and vulcanizing the resulting mass.

4. A method of producing a synthetic compound which is resistant to oil, water, ozone, corrosion and aging, is non-flowing at temperatures up to at least 60° C., and is still flexible when in thin strip form at a temperature of minus 25° C., which method comprises preparing a mixture comprising the following substances in approximately the parts by weight specified:

| | Parts by weight |
|---|---|
| Acetone-insoluble polymer of acrylic acid ethyl ester | 27.0 |
| Diamyl phthalate | 5.0 |
| Active gas soot | 19.0 |
| Talc | 47.5 |
| Beta-naphthol | 1.0 |
| Sulphur | 0.5 | and subjecting the resulting mass to a temperature sufficient to vulcanize the acetone-insoluble polymer of acrylic acid ethyl ester.

PAUL NOWAK.
HERMANN HOFMEIER.